United States Patent
Soh et al.

(10) Patent No.: US 8,427,422 B2
(45) Date of Patent: Apr. 23, 2013

(54) INPUT DEVICE AND METHOD FOR PROTECTING INPUT INFORMATION FROM EXPOSURE

(75) Inventors: Byung-seok Soh, Suwon-si (KR); Kyu-yong Kim, Yongin-si (KR); Sang-youn Kim, Seoul (KR); Gyung-hye Yang, Seoul (KR); Yong-beom Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1209 days.

(21) Appl. No.: 11/434,276

(22) Filed: May 16, 2006

(65) Prior Publication Data

US 2007/0046627 A1 Mar. 1, 2007

(30) Foreign Application Priority Data

Aug. 29, 2005 (KR) .................. 10-2005-0079538

(51) Int. Cl.
*G09G 5/00* (2006.01)
*G06F 3/041* (2006.01)
*G06F 21/00* (2006.01)

(52) U.S. Cl.
USPC ............. 345/156; 345/173; 713/183

(58) Field of Classification Search .......... None
See application file for complete search history.

(56) References Cited

U.S. PATENT DOCUMENTS

| | | | | |
|---|---|---|---|---|
| 5,821,933 A | * | 10/1998 | Keller et al. | 715/741 |
| 5,828,834 A | * | 10/1998 | Choi | 726/18 |
| 5,907,288 A | * | 5/1999 | Clark et al. | 340/5.54 |
| 6,072,868 A | * | 6/2000 | Irvin | 379/355.09 |
| 6,092,130 A | * | 7/2000 | Horiike | 710/69 |
| 2003/0030544 A1 | * | 2/2003 | Smith | 340/407.1 |
| 2003/0110402 A1 | * | 6/2003 | Park | 713/202 |
| 2004/0054929 A1 | * | 3/2004 | Serpa | 713/202 |
| 2005/0003761 A1 | * | 1/2005 | Chandley | 455/41.3 |
| 2005/0125683 A1 | * | 6/2005 | Matsuyama et al. | 713/189 |
| 2005/0185063 A1 | * | 8/2005 | Ikehata et al. | 348/222.1 |
| 2005/0273625 A1 | * | 12/2005 | Dayan et al. | 713/184 |
| 2006/0092177 A1 | * | 5/2006 | Blasko | 345/619 |
| 2006/0179471 A1 | * | 8/2006 | Roth | 726/2 |
| 2007/0124601 A1 | * | 5/2007 | Singh et al. | 713/189 |

FOREIGN PATENT DOCUMENTS

| | | |
|---|---|---|
| JP | 2001-34396 | 2/2001 |
| KR | 10-2005-0022576 | 3/2005 |

* cited by examiner

*Primary Examiner* — Amare Mengistu
*Assistant Examiner* — Antonio Xavier
(74) *Attorney, Agent, or Firm* — Staas & Halsey LLP (57) ABSTRACT

An input device and method for protecting input information from exposure, in which the time of input of information is determined using a tactile output to protect the input information from being exposed. The input device for protecting input information from exposure includes a user-input module for receiving predetermined input information from a user, a control module for setting the information inputted in association with a tactile signal among the input information as user-input information, and a tactile-output-generation module for generating and providing the tactile signal to the user-input module under the control of the control module.

13 Claims, 6 Drawing Sheets

INPUT DEVICE AND METHOD FOR PROTECTING INPUT INFORMATION FROM EXPOSURE

CROSS-REFERENCE TO RELATED APPLICATION

This application is based on and claims priority from Korean Patent Application No. 10-2005-0079538 filed on Aug. 29, 2005 in the Korean Intellectual Property Office, the disclosure of which is incorporated herein by reference.

BACKGROUND OF THE INVENTION

1. Field of the Invention

The present invention relates to an input device and method for protecting input information from exposure and, more particularly, to an input device and method for protecting input information from exposure by determining an input time point of the information using a tactile output.

2. Description of Related Art

Protection of personal information from exposure is an important issue. Various types of user authentication methods have been suggested. Among them, the most convenient method is to allow a user to input a password through a key input device such as a touch screen or a keypad.

However, the method for inputting the password using the key input device has a problem in that the password may be exposed when the user inputs the password. For example, when the user inputs the password through a touch screen of a cash dispenser, a keypad of a cellular phone or a door, movement of the user's finger may be exposed to unwanted observation. In this case, the password may also be exposed.

Therefore, it is necessary to protect important information such as a password from being visually exposed to a third party when the user inputs the password.

BRIEF SUMMARY

Accordingly, an aspect of the present invention has been made to solve the above-mentioned problems occurring in the prior art, and an object of the present invention is to provide an input device and method for protecting input information from exposure, that can protect input information from being exposed using a tactile output.

According to an aspect of the present invention, there is provided an input device for protecting input information from exposure, which includes a user-input module for receiving predetermined input information from a user, a control module for determining the information inputted in association with a tactile signal among the input information as user-input information, and a tactile-output-generation module for generating and providing the tactile signal to the user-input module under the control of the control module.

In another aspect of the present invention, there is provided an input method for protecting input information from exposure, which includes the steps of a) receiving predetermined input information from a user, b) generating and providing a tactile signal, and c) determining the information inputted in association with the tactile signal among the input information as user-input information.

According to another aspect of the present invention, there is provided an input device for protecting input information from exposure, including: a user-input module receiving information including user authentication information and other information; a tactile-output-generation module outputting a tactile signal to the user-input module; and a controller controlling output of the tactile signal, comparing received other information to stored other information, and controlling the tactile-output generation module to output the tactile signal when the other information is the same as the stored other information.

According to another aspect of the present invention, there is provided a computer-readable storage medium encoded with processing instructions for causing a processor to execute the aforementioned method.

Additional and/or other aspects and advantages of the present invention will be set forth in part in the description which follows and, in part, will be obvious from the description, or may be learned by practice of the invention

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block or blocks.

The computer program instructions may also be loaded into a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Input information according to an embodiment of the present invention is composed of numerals or characters, which is directly input by a user. An example of the input information includes user's personal information such as a password.

Also, an input device according to an embodiment of the present invention is a device that allows the user to input the information.

Figure 1:
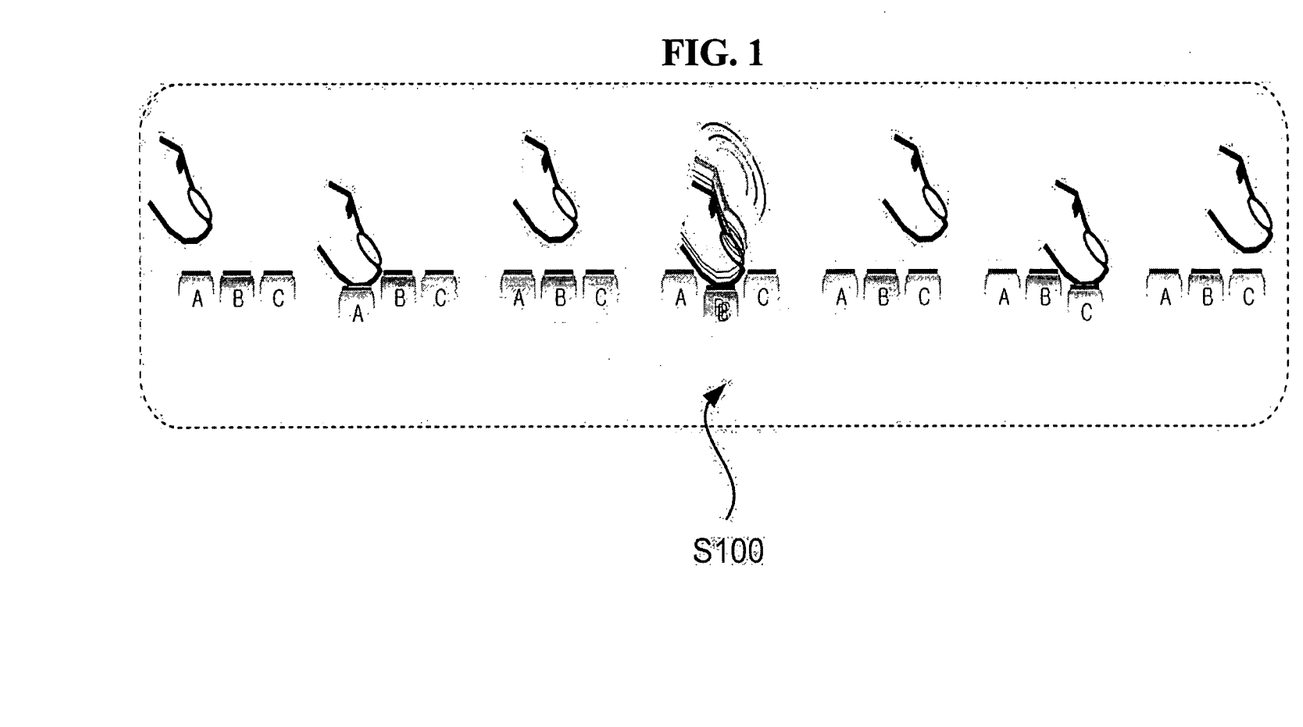
FIG. 1 is an exemplary view illustrating a concept of the present invention.

FIG. 1 is an exemplary view illustrating a concept of the present invention. To allow the user to protect input information from exposure, a process of inputting information required by an input device after a tactile signal is generated is illustrated in FIG. 1.

For example, if the user intends to input the character "C", the input device recognizes a key value inputted after a tactile signal is generated without recognizing the initial key inputs.

Referring to FIG. 1, when the user pushes the "B" button after pushing the "A" button, a tactile signal, such as a vibration, is generated S100. If the user pushes the "C" button after feeling the tactile signal while pushing "B" button, the input device recognizes "C" as the user-input information input.

In other words, the input device of the present invention recognizes the information that is inputted by the user after the tactile signal is generated as input information. At this time, the input device may recognize N successive inputs inputted after the tactile signal is generated as input information. Alternatively, the input device may recognize one input inputted after the tactile signal is generated as input information. The former example will be described with reference to FIGS. 3 and 4 while the latter example will be described with reference to FIGS. 5 and 6.

The above examples may be inefficient if there is no danger that the user-input information will be exposed. This is because the user may desire to immediately obtain the desired result by inputting information required by the input device regardless of the tactile signal.

In this case the input device is required to recognize input information without using the tactile signal. Input methods of this input device will be described in detail with reference to FIGS. 7 and 8.

Figure 2:
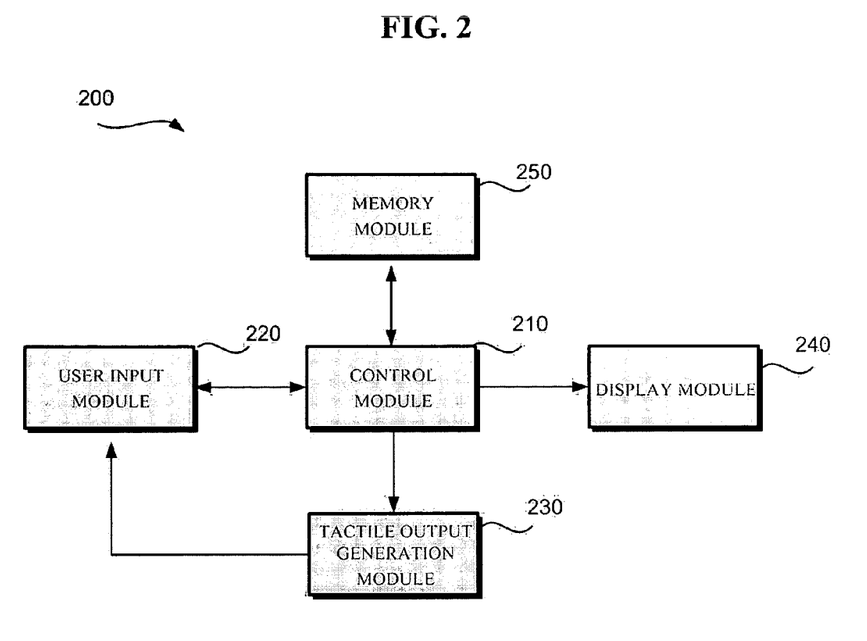
FIG. 2 is a block diagram illustrating the construction of an input device according to an embodiment of the present invention.

FIG. 2 is a block diagram illustrating the input device according to an embodiment of the present invention. Referring to FIG. 2, the input device 200 includes a control module 210, a user-input module 220, a tactile-output-generation module 230, a display module 240, and a memory module 250.

The term "module," as used herein, includes, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The components and modules may be combined into fewer components and modules or further separated into additional components and modules.

The user-input module 220 allows the user to input information required by the input device 200. A keypad or touch screen may be used as the user-input module 220. The keypad is designed to allow the user to input numbers or characters, and the touch screen is provided with number or character keys to allow the user to input them. Also, the user-input module 220 transmits the tactile signal generated by the tactile output-generation module 230 to the user in conjunction with the tactile-output-generation module 230.

The memory module 250 stores input information. A temporary memory of the input device 200, as shown in FIG. 2, may be used as the memory module 250. Alternatively, a memory provided inside another device connected to the same network as the input device 200 may be used as the memory module 250. Thus, it is to be understood that any memory that can store input information required to check whether input information inputted by the user-input module 220 is correct may be used as the memory module 250.

Furthermore, the memory module 250 may temporarily store the user-input information from user-input module.

The control module 210 checks whether information input via the user-input module 220 is equal to information stored in the memory module 250. If the information input via the user-input module 220 is equal to the information stored in the memory module 250, the control module 210 provides a corresponding function of the input device 200.

Also, the control module 210 allows the tactile-output-generation module 230 to output the tactile signal to the user-input module 220 in order to identify whether a value input via the user-input module 220 is to the same as the user's information.

The display module 240 may display the value inputted by the user using a specific character such as "*", or may output a corresponding message if the information input by the user is not right.

The tactile-output-generation module 230 outputs the tactile signal to the user-input module 220 in accordance with a predetermined manner under the control of the control module 210.

The tactile-output-generation module 230 is one of several types in accordance with the user-input module 220.

For example, if the touch screen is used as the user-input module 220, the tactile-output-generation module 230 vibrates the touch screen. Also, if the keypad is used as the user-input module 220, the tactile-output-generation module 230 transmits the tactile signal to the entire keypad or each key using a vibration motor.

In other words, the tactile-output-generation module 230 generates the tactile signal in a mechanical or electromagnetic manner known in the art, and transmits the generated tactile signal to the user-input module 220. To this end, the vibration motor or a force-feedback touch panel may be used.

Hereinafter, a method for extracting information from the input value inputted by the user via the tactile signal system of the input device 200 shown in FIG. 2 will be described in detail in the following.

For convenience, a password of four numbers (herein, 1, 7, 9, 8) will be described as input information. However, it is to be understood that input information is not limited to the above password.

Figure 3:
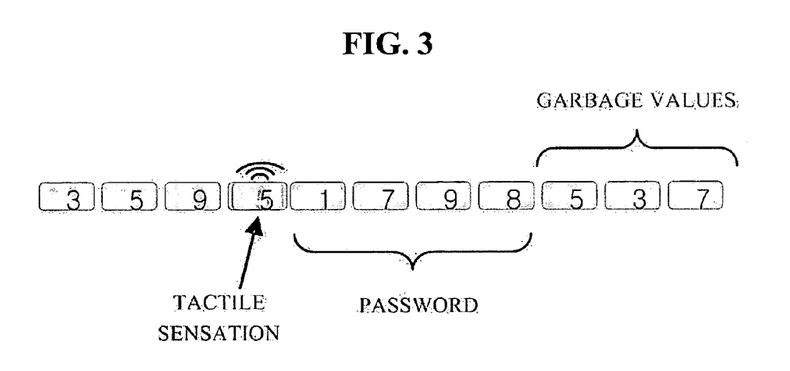
FIG. 3 is an exemplary view illustrating an input method according to an embodiment of the present invention.

FIG. 3 is an exemplary view illustrating an input method according to one embodiment of the present invention. In the input method, successive N inputs (N=4), which are inputted after the tactile signal is generated, are recognized as input information.

For example, when the user pushes 5, the control module 210 allows the tactile-output-generation module 230 to generate the tactile signal and outputs the tactile signal to the user-input module 220. Then, the user feels the tactile sensation through the output tactile signal and successively pushes the four keys "1", "7", "8", and "9" (the password).

The control module 210 recognizes the pushed numbers as the user-input information.

Then, the control module 210 checks whether the four numbers are the same as the user-input information stored in the memory module 250. If the four numbers are the same as the user-input information stored in the memory module 250, the control module 210 provides a corresponding function of the input device 200. However, if the four numbers are not the same as the user-input information stored in the memory module 250, the control module 210 outputs an error message through the display module 240.

The control module 210 processes input values input after the N inputs as insignificant values, i.e., garbage values.

Figure 4:
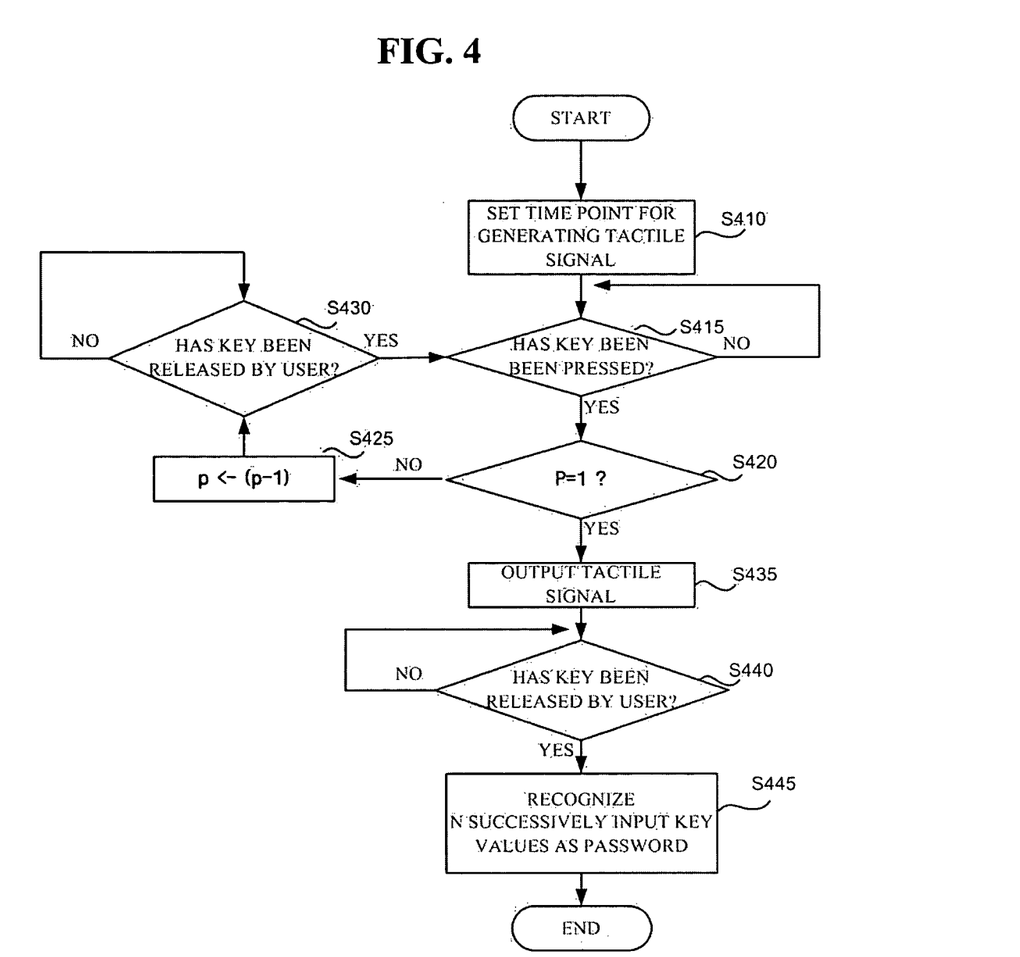
FIG. 4 is a flowchart illustrating an input method according to an embodiment of the present invention.

FIG. 4 is a flowchart illustrating the input method according to one embodiment of the present invention. The input method shown in FIG. 3 will be described in more detail in the following.

First, the control module 210 sets a time point for generating the tactile signal S410. To this end, the control module 210 selects an arbitrary value among values of "1" to "M" and assigns the selected value as "p". Here, "M" is a real number above "1".

Then, the control module 210 senses through the user-input module 220 whether the key has been pushed S415. If the key has been pushed, the control module 210 checks the value of "p" S420.

If the value of "p" is not "1", the control module 210 decreases the value of "p" by "1" and checks through the user-input module 220 whether the key has been released by the user S430. At this time, if the key has been released by the user, the control module 210 checks through the user-input module 220 whether the user has pushed the key S415.

In step S420, if the value of "p" is equal to "1", the control module 210 allows the tactile-output-generation module 230 to output the tactile signal S435, and checks through the user-input module 220 whether the key has been released by the user S440. At this time, if the key has been released by the user, the control module 210 recognizes N successively input key values (N=4) as the password S445.

Figure 5:
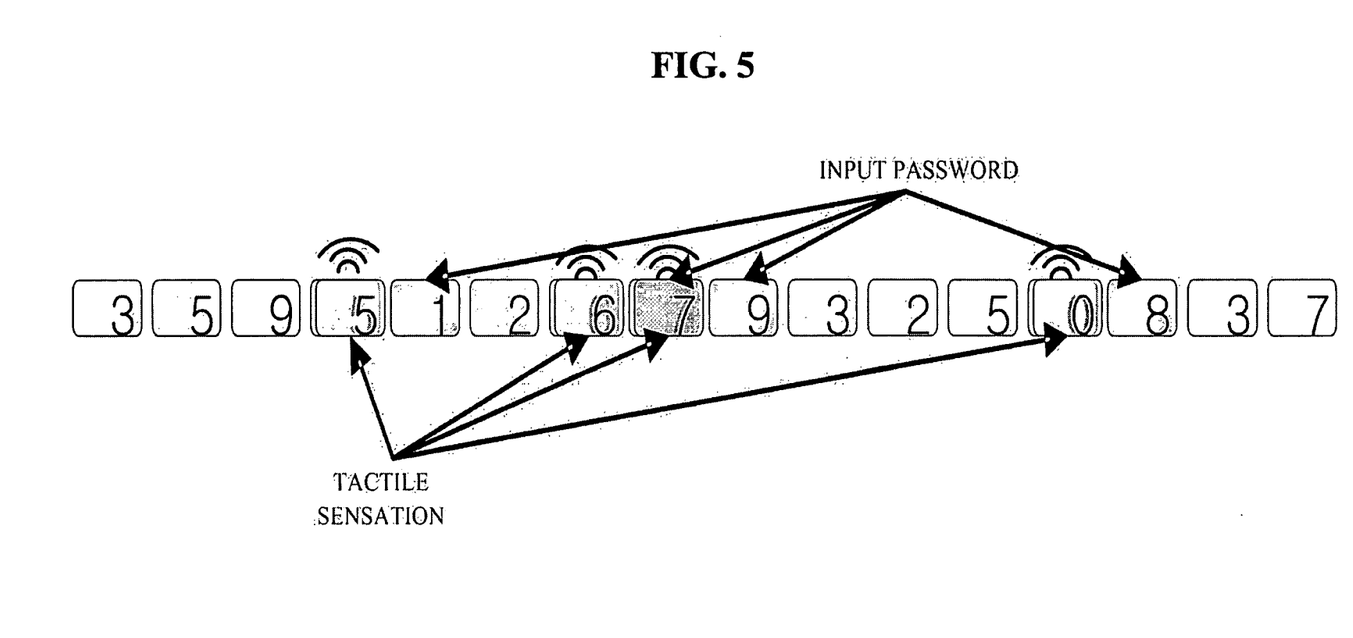
FIG. 5 is an exemplary view illustrating an input method according to another embodiment of the present invention.

FIG. 5 is an exemplary view illustrating an input method according to another embodiment of the present invention. In this input method, one input, which is inputted after the tactile signal is generated, is recognized as input information.

For example, when the user pushes "5", the control module 210 allows the tactile-output-generation module 230 to generate the tactile signal, and output the same to the user-input module 220. Then, the user feels the tactile sensation and pushes the first number "1" of the 4-digit password.

Afterwards, when the user pushes "6", the control module 210 allows the tactile-output-generation module 230 to generate the tactile signal and output the same to the user-input module 220. Then, the user feels the tactile sensation again and pushes the second number "7" of the 4-digit password.

Subsequently, when the user pushes "7", the control module 210 allows the tactile-output-generation module 230 to generate the tactile signal and output the same to the user-input module 220. Then, the user feels the tactile sensation again and pushes the third number "9" of the 4-digit password.

Finally, when the user pushes "0", the control module 210 allows the tactile-output-generation module 230 to generate the tactile signal and output the same to the user-input module 220. Then, the user feels the tactile sensation again and pushes the fourth number "8" of the 4-digit password.

In this way, the control module 210 allows the tactile-output-generation module 230 to generate the tactile signal N times (four times) in accordance with a predetermined manner to transmit the tactile sensation to the user through the user-input module 220. Thus, the control module 210 recognizes the user's input value as the user-input information.

If four numbers are recognized as the user-input information, the control module 210 checks whether the four numbers are the same as the user-input information stored in the memory module 250. If the four numbers are the same as the user-input information stored in the memory module 250, the control module 210 provides a corresponding function of the input device 200. However, if the four numbers are not the same as the user-input information stored in the memory module 250, the control module 210 outputs an error message through the display module 240.

Then, the control module 210 processes values inputted after the N inputs as insignificant values, i.e., garbage values.

Figure 6:
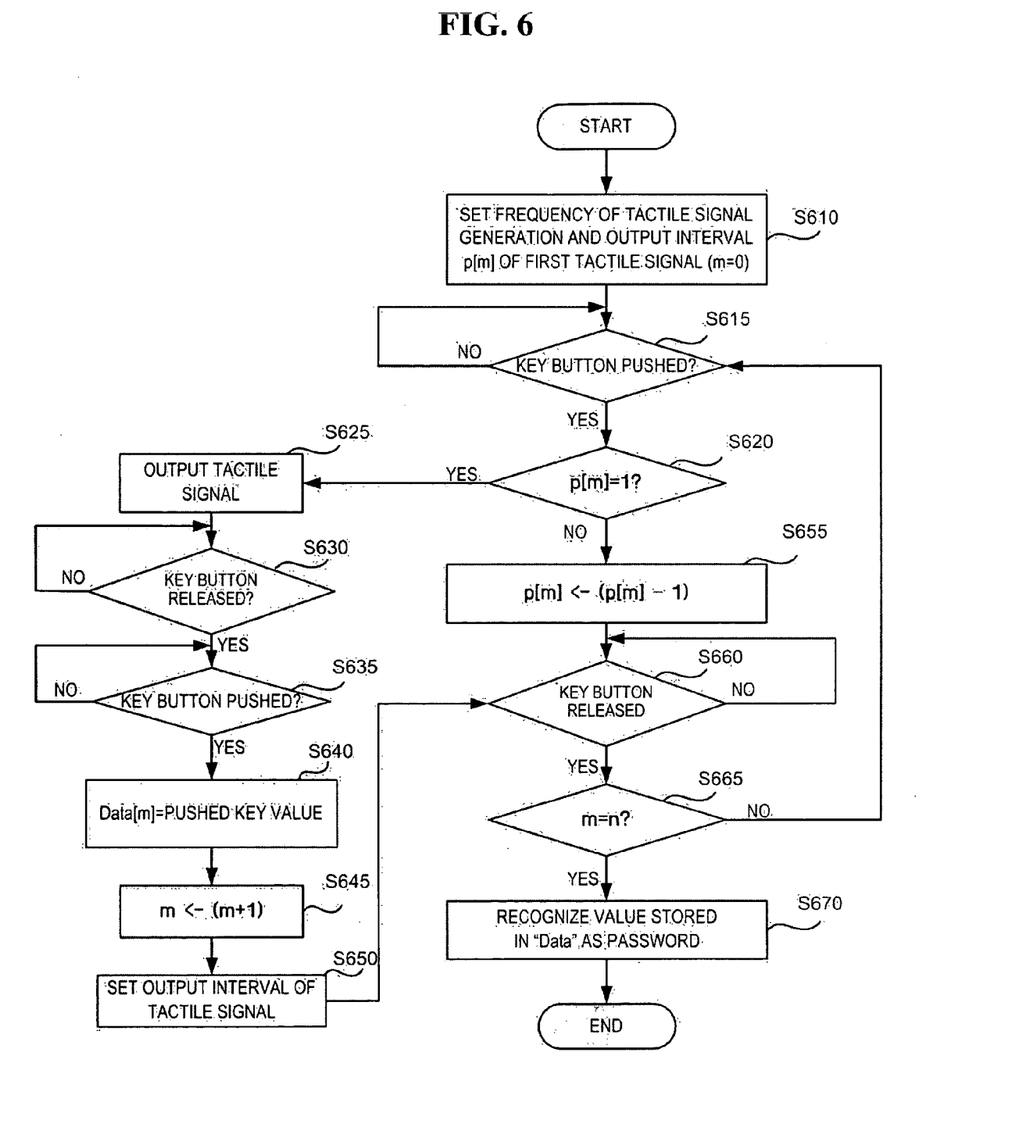
FIG. 6 is a flowchart illustrating an input method according to another embodiment of the present invention.

FIG. 6 is a flowchart illustrating the input method according to another embodiment of the present invention. The input method shown in FIG. 5 will be described in more detail in the following.

First, the control module 210 sets the number of times "n" the tactile signal is generated and an output interval p[m] of the first tactile signal S610 by selecting an arbitrary value among values of natural numbers from 1 to M.

The number of times the tactile signal is generated represents the number of input information inputted by the user. For example, if the input information is a four-digit password, the number of times "n" the tactile signal is generated is "4".

The output interval p[m] of the tactile signal is used to determine the time point when the tactile-output-generation module 230 generates each tactile signal. To this end, the control module 210 selects an arbitrary value among values of "1" to "M" and assigns the selected value as p[m]. Here, "M" is a real number above "1". Then, the control module 210 decreases the value of p[m] by "1". When the value of p[m] is "1", the control module 210 allows the tactile-output-generation module 230 to generate the tactile signal. Here, m is an index. For example, p[0] represents the output of the first tactile signal, and p[1] represents the output of the second tactile signal.

The control module 210 checks through the user-input module 220 whether the key has been pushed S615. If the key has been pressed, the control module 210 checks whether the output interval of the tactile signal is "1" S620.

If the output interval of the tactile signal is "1", the control module 210 allows the tactile-output-generation module 230 to output the tactile signal to the user-input module 220 S625, and checks whether the key has been released by the user S630.

If the key has been released by the user, the control module 210 again checks whether a key has been pushed S635. Thus, the control module 210 recognizes the pushed key as the user-input information, and stores the same in the memory module 250 S640. For example, the control module 210 may create a data structure "Data", and store the value of the pushed key in Data[m].

Then, the control module 210 increases the value of "m" by "1" S645, and sets the output interval of the tactile signal to this increased value of "m" S650. Afterwards, the control module 210 checks whether the key has been released by the user S660. Here, the output interval of the tactile signal is set by selecting an arbitrary value among values of natural numbers from 1 to M.

Meanwhile, in step S620, if the output interval of the tactile signal is not equal to "1", the control module 210 decreases the output interval p[m] of the tactile signal by "1" S665 and checks whether the key has been released by the user S660.

In step S660, if the key has been released by the user, the control module 210 checks whether the value of m is equal to n, i.e., all the user information has been inputted. If the user information has been inputted, the control module 210 recognizes the value stored in the arrangement "Data" as the password S670.

In step S665, if the value of m is not equal to n, the process returns to S615 so that the control module 210 can check whether the key has been pushed by the user S615.

Figure 7:
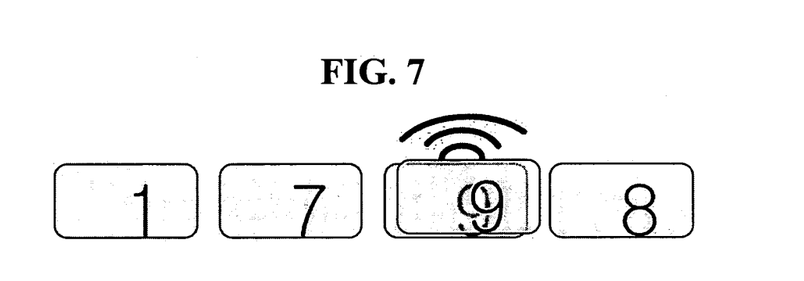
FIG. 7 is an exemplary view illustrating an input method according to still another embodiment of the present invention.

FIG. 7 is an exemplary view illustrating an input method according to another embodiment of the present invention. In this method, the input device recognizes the user-input information regardless of the tactile signal.

For example, if the user pushes a previously set end key after successively pushing four numbers "1", "7", "9", and "8" of the password, the four numbers inputted before the end key is pushed are recognized as the user-input information even though the user feels the tactile sensation in the middle of inputting the number "9".

Figure 8:
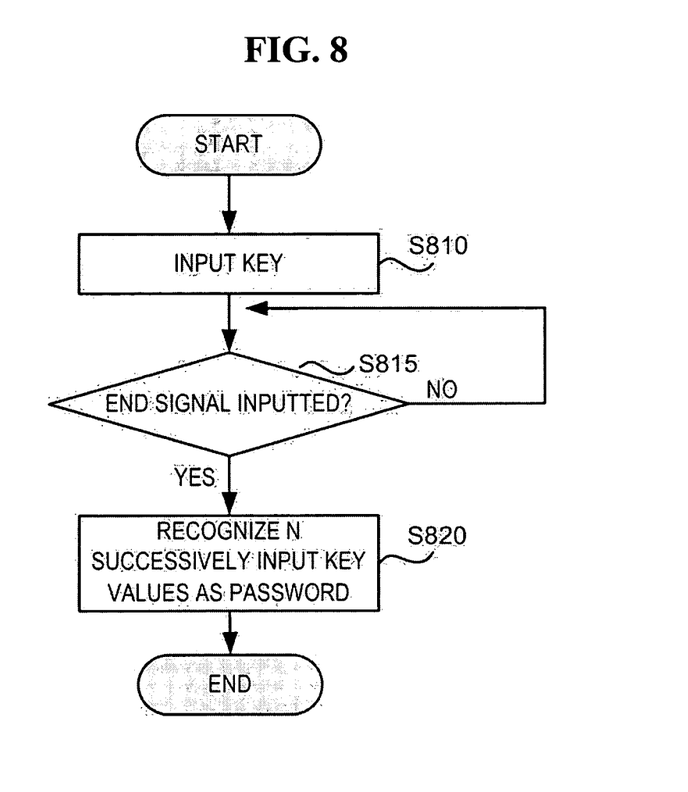
FIG. 8 is a flowchart illustrating an input method according to still another embodiment of the present invention.

FIG. 8 is a flowchart illustrating an input method according to another embodiment of the present invention. The input method shown in FIG. 7 will be described in more detail in the following.

If the user successively inputs values via the keys and the user-input module 220, the control module 210 stores the input key values in the memory module 250.

Then, if an end signal is generated, or if the end signal is generated after the tactile signal is outputted at an arbitrary time point while the user inputs the key values in step S810, the control module 210 recognizes the N successively input key values in step S810 as the password S820.

At this time, the end signal may be an input signal of a specific key of the user-input module 220 or a signal generated by continuously pushing the key corresponding to the last number "8" of the password for a predetermined time. To this end, the control module 210 senses as how many times the user pushes the key. If it is determined that the user has pushed the key for a predetermined time, the control module 210 recognizes the previous N inputs as the user-input information.

Furthermore, the end signal may be generated when no button has been pushed for a predetermined time after the key corresponding to the last number of the password has been pushed.

As described above, according to the input device and method for protecting input information from exposure, the time point of information input is determined using the tactile output sensed by the user in order to protect the input information from being exposed.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An input device for protecting input information from exposure, the device comprising:
   a user-input module operable to receive keystroke inputs from a user;
   a tactile-output-generation module operable to provide a tactile signal to the user-input module;
   a processor operable to control the tactile-output-generation module to provide the tactile signal to the user through the user-input module only when a predetermined first number of keystroke inputs are determined to have been received from the user through the user-input module by counting the keystrokes,
   wherein the tactile signal is regarding an instruction to the user indicating when the user should input at least one predetermined input; and
   a control module operable to accept a next immediate input entered by the user as user input information when the processor generates the tactile signal,
   wherein the control module does not accept the next immediate input entered by the user as user input information when the processor does not generate the tactile signal, and
   wherein the control module is operable to check whether the user input information is equal to predetermined input information.

2. The input device as claimed in claim 1, wherein the control module determines that the next immediate input that is successively inputted by the user-input module after the tactile signal has been provided to the user-input module is the user-input information.

3. The input device as claimed in claim 1, wherein the user-input module is a touch screen.

4. The input device as claimed in claim 1, wherein the user-input module is a keypad.

5. The input device as claimed in claim 1, wherein after the tactile signal is provided to the user through the user-input module, the processor is further operable to determine whether a second number of inputs received from the user through the user-input module reaches a predetermined value.

6. The input device as claimed in claim 5, wherein if the second number of inputs received from the user through the user-input module reaches the predetermined value, the processor is further operable to determine that the inputs received after the tactile signal is provided to the user-input module correspond to the predetermined input information.

7. An input method for protecting input information from exposure, the method comprising:
   receiving keystroke inputs from a user;
   determining whether a predetermined first number of keystroke inputs are received from the user by counting the keystrokes;
   generating a tactile signal only when the determining indicates that the predetermined first number of keystroke inputs have been received from the user,
   wherein the tactile signal is regarding an instruction to the user indicating when the user should input at least one predetermined input; and accepting a next immediate input entered by the user as user input information when the processor generates the tactile signal, wherein the accepting does not accept the next immediate input entered by the user as user input information when the processor does not generate the tactile signal, and wherein the accepting is operable to check whether the user input information is equal to predetermined input information.

8. The input method as claimed in claim 7, wherein the determining comprises setting the next immediate input that is successively inputted by the user-input module after the tactile signal is provided as the user-input information.

9. The input method as claimed in claim 7, wherein the receiving comprises receiving the inputs from the user through a touch screen.

10. The input method as claimed in claim 7, wherein the receiving includes receiving the inputs from the user through a keypad.

11. The input method as claimed in claim 7, wherein after the tactile signal is generated, the method further comprises: determining whether a predetermined second number of inputs are received from the user.

12. The input method as claimed in claim 11, wherein if the second number of inputs are received from the user, the method further comprises: determining that the inputs received from the user after the tactile signal is generated correspond to the predetermined input information.

13. A non-transitory computer-readable storage medium encoded with processing instructions for causing a processor to execute an input method for protecting input information from exposure, the method comprising:

receiving keystroke inputs from a user;

determining whether a predetermined first number of keystroke inputs are received from the user by counting the keystrokes; and generating a tactile signal only when the determining indicates that the predetermined first number of inputs have been received from the user, wherein the tactile signal is regarding an instruction to the user indicating when the user should input at least one predetermined input; and accepting a next immediate input entered by the user as user input information when the processor generates the tactile signal, wherein the accepting does not accept the next immediate input entered by the user as user input information when the processor does not generate the tactile signal, and wherein the accepting is operable to check whether the user input information is equal to predetermined input information.

* * * * *